United States Patent
Rajendran et al.

(10) Patent No.: US 7,077,566 B2
(45) Date of Patent: Jul. 18, 2006

(54) METHODS AND APPARATUS FOR TEMPERATURE MEASUREMENT AND CONTROL IN ELECTROMAGNETIC COILS

(75) Inventors: Veera Palanivelu Rajendran, Niskayuna, NY (US); Mehmet Arik, Niskayuna, NY (US); Bulent Aksel, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/733,141

(22) Filed: Dec. 11, 2003

(65) Prior Publication Data

US 2005/0129088 A1 Jun. 16, 2005

(51) Int. Cl.
*G01K 11/00* (2006.01)
*G01J 5/00* (2006.01)

(52) U.S. Cl. ............... 374/161; 374/131; 374/121
(58) Field of Classification Search ........ 374/130, 374/131, 132, 208, 161, 120, 152, 159
See application file for complete search history.

(56) References Cited

U.S. PATENT DOCUMENTS

| | | | | |
|---|---|---|---|---|
| 4,298,794 A * | 11/1981 | Snitzer et al. | ......... | 250/227.14 |
| 4,827,487 A * | 5/1989 | Twerdochlib | ............... | 374/131 |
| 5,251,274 A * | 10/1993 | Carlstrom et al. | ............ | 374/17 |
| 5,306,088 A * | 4/1994 | Zoerner | ...................... | 374/131 |
| 5,493,113 A * | 2/1996 | Dunphy et al. | ............. | 356/480 |
| 5,513,913 A * | 5/1996 | Ball et al. | ................... | 374/120 |
| 5,562,027 A * | 10/1996 | Moore | ........................ | 374/130 |
| 6,079,875 A * | 6/2000 | Klass et al. | ................. | 374/130 |
| 6,513,972 B1* | 2/2003 | Jenkins | ...................... | 374/161 |
| 6,527,441 B1* | 3/2003 | Cranch et al. | ............. | 374/161 |
| 6,547,435 B1* | 4/2003 | Grosswig et al. | ........... | 374/137 |
| 6,587,188 B1* | 7/2003 | Gleine et al. | ................. | 356/32 |
| 6,636,041 B1 | 10/2003 | Arz et al. | | |
| 6,640,647 B1* | 11/2003 | Hong et al. | .................... | 73/800 |
| 6,659,640 B1* | 12/2003 | Ruffa | ........................ | 374/161 |
| 2001/0022804 A1* | 9/2001 | Helmig et al. | .............. | 374/161 |
| 2003/0156777 A1* | 8/2003 | Bosselmann et al. | ......... | 385/12 |
| 2005/0013342 A1* | 1/2005 | Kaminski et al. | ........... | 374/152 |

OTHER PUBLICATIONS

Mark Wippich and Kathy Li Dessau, "Tunable Lasers and Fiber-Bragg-Grating Sensors," *The Industrial Physicist*, pp. 24-27 (Jun./Jul. 2003).

A. Fernandez Fernandez, H. Ottevaere, C. Van Ierschot, K. Panajatov, F. Berghmans and H. Thienpont, "Multi-parameter Force Sensing with Fiber Bragg Grating Sensors," Proceedings Symposium IEEE/LEOS, Benelux Chapter, Amsterdam (2002).

(Continued)

*Primary Examiner*—Diego Gutierrez
*Assistant Examiner*—Mirellys Jagan
(74) *Attorney, Agent, or Firm*—Fletcher Yoder

(57) ABSTRACT

A method for monitoring temperature in at least one location of an electromagnetic coil assembly having at least one electrical winding. The method includes passing a light through a non-magnetic optical fiber inserted into a sheath that is wound with the electrical winding. The sheath is wound and cast with the electromagnetic coil assembly, and the optical fiber is slidably inserted therein. The optical fiber has a core containing at least a first Bragg grating etched therein. The method further includes detecting a wavelength of light reflected from the first Bragg grating and determining a temperature of the electromagnetic coil assembly at a location of the first Bragg grating utilizing the detected wavelength of the light reflected from the first Bragg grating.

25 Claims, 2 Drawing Sheets

OTHER PUBLICATIONS

Xiao Chun Li, Fritz Prinz and John Seim, "Thermal Behavior of a Metal Embedded Fiber Bragg Grating Sensor," *Institute of Physics Publishing,* Smart Materials and Structures 10, pp. 575-579 (2001).

Jaehoon Jung, Hui Nam, Byoungho Lee, Jae Oh Byun and Nam Seong Kim, "Fiber Bragg Grating Temperature Sensor with Controllable Sensitivity," *Applied Optics,* vol. 38, No. 13, pp. 2752-2754 (May 1, 1999).

Sung Chul Kang, Se Yoon Kim, Sang Bae Lee, Seo Won Kwon, Sang Sam Choi and Byoungho Lee, "Temperature-Independent Strain Sensor System Using a Tilted Fiber Bragg Grating Demodulator," *IEEE Photonics Technology Letters,* vol. 10, No. 10, pp. 1461-1463 (Oct. 1998).

Rogerio M. Cazo, Carmen L. Barbosa, Haroldo T. Hattori, Renato C. Rabelo, Osni Lisboa and Jorge L.S. Ferreira, "Fiber Brag Grating Temperature Sensor," *Optics (Optic Guides and Staple Fibres),* Coordinator: Carlos Monken, Location Unknown, (May 17, 2001).

* cited by examiner

METHODS AND APPARATUS FOR TEMPERATURE MEASUREMENT AND CONTROL IN ELECTROMAGNETIC COILS

BACKGROUND OF THE INVENTION

This invention relates generally to methods and apparatus for measuring temperatures in electromagnetic coil assemblies that are particularly suitable for use with coil assemblies having high current electromagnetic windings. Examples of such coils are found in magnetic resonance imaging apparatus and elsewhere.

At least one known magnetic resonance imaging (MRI) apparatus utilizes thermocouples, resistors, and/or resistive thermal devices (RTDs) to detect gradient coil temperatures. However, these devices interfere with the electromagnetic characteristics of the gradient coils and are rather difficult to install. In addition, very small location shifts (such as 0.1 mm) for any of the gradient coils (X, Y or Z) resulting from the installation and use of these devices strongly affect the magnetic field in a field of interest and thus adversely affect imaging performance. As a result, the temperature distribution of MR gradient coils in at least one known MRI apparatus is measured at only few locations using thermocouples, resistors, and/or RTDs that are isolated from the electromagnetics of the MRI apparatus itself. To avoid interference with the magnetic field of the coil and magnetization of the measurment device, T type thermocouples or thermisters, and non magnetic RTDs are used, with the number of sensors kept to a minimum due to their wiring requirements.

Arz et al. describe (U.S. Pat. No. 6,636,041) a magnetic resonance apparatus having at least one section of an optical fiber with at least one Bragg grating having a Bragg wavelength. The Bragg grating is arranged with respect to the magnetic resonance apparatus so that at least one deformation of the magnetic resonance apparatus can be acquired. For acquiring deformations of the gradient coil system, optical fibers with Bragg gratings are integrated into the gradient coil system. A cast, hollow-cylindrical gradient coil system has sections of optical fibers as well as gradient coils, etc. The sections of the optical fibers are arranged mechanically fixed in the gradient coil system as a result of being therewith upon manufacture of the gradient coil system, so that oscillations of the gradient coil system arising during operation of the magnetic resonance apparatus are directly transmitted onto the sections. A co-casting of sections is used so that deformations of a cast component alters the Bragg wavelength to allow measurement of a deformation. Although suited for measuring strain, the Arz et al. apparatus is less well suited for measuring temperature. More particularly, the co-casting of the optical fiber with other sections of the gradient coil does not allow a change in Bragg wavelength due to temperature to be distinguished from a change due to other stresses, such as magnetic or other non-temperature related deformational stresses on the foil.

BRIEF DESCRIPTION OF THE INVENTION

There is therefore provided, in some configuration of the present invention, a method for monitoring temperature in at least one location of an electromagnetic coil assembly. The electromagnetic coil assembly includes at least one electrical winding. The method includes passing light through a non-magnetic optical fiber inserted in a non-magnetic sheath wound and cast with an electrical winding. The optical fiber has a core containing at least a first Bragg grating etched therein. The method further includes detecting a wavelength of light reflected from the first Bragg grating and determining a temperature of the electromagnetic coil assembly at a location of the first Bragg grating utilizing the detected wavelength of the light reflected from the first Bragg grating.

Other configurations of the present invention provide an electromagnetic coil assembly kit that includes an electrically conducting electromagnetic winding and a hollow, non-magnetic sheath would and cast therewith. Also provided is a non-magnetic fiber optic fiber configured for insertion within the sheath and having distributed therein a plurality of Bragg gratings each configured to reflect light indicative of temperature at a location of the Bragg gratings in the electromagnetic coil assembly.

Still other configurations of the present invention provide a measuring apparatus for temperature. The measuring apparatus includes an electromagnetic coil assembly having an electrically conducting electromagnetic winding and a non-magnetic sheath wound and cast therewith. A non-magnetic fiber optic fiber is inserted in the sheath in thermal communication with the electromagnetic winding. The fiber optic fiber has distributed therein a plurality of Bragg gratings each configured to reflect light indicative of a temperature at a location thereof. The measuring apparatus also includes a light source configured to pass light into the fiber optic fiber, a reflected light sensor configured to sense light reflected back from the Bragg gratings, and a processor responsive to the reflected light sensor to determine temperature utilizing the reflected light.

Configurations of the present invention provide optical temperature measurements while being immune to interference from magnetic field and from electromagnetic interference. Detailed temperature distributions for apparatus such as MRI systems can thus be made available to enable better temperature control and operation, thus providing MRI systems with improved performance and reliability. Moreover, optical fibers are non-magnetic in the sense that they do not carry current, and do not disrupt or alter a magnetic field in a region of interest of the MRI apparatus. In addition, wires are not required from each temperature sensor to a data acquisition system. Moreover, because the measurement system employs light instead of electrical currents for its sensors, it is essentially immune from electromagnetic interference. Also, because the sheath is cast with the electromagnetic coil assembly rather than the optical fiber having the Bragg gratings therein, optical fibers in a coil can be replaced if necessary (for example, with an optical fiber having a greater or lesser number of Bragg gratings). Also, although temperatures within the coil are transmitted to the sheath and thus indirectly to the fiber optic Bragg gratings, the sheath can form a relatively loose fit to the fiber optic fiber and thus avoid transmitting strain from the coil to the fiber optic fiber. As a result, temperature can be directly measured, and the measurement is relatively free of interference resulting from stress or strain on the fiber.

DETAILED DESCRIPTION OF THE INVENTION

Figure 1:
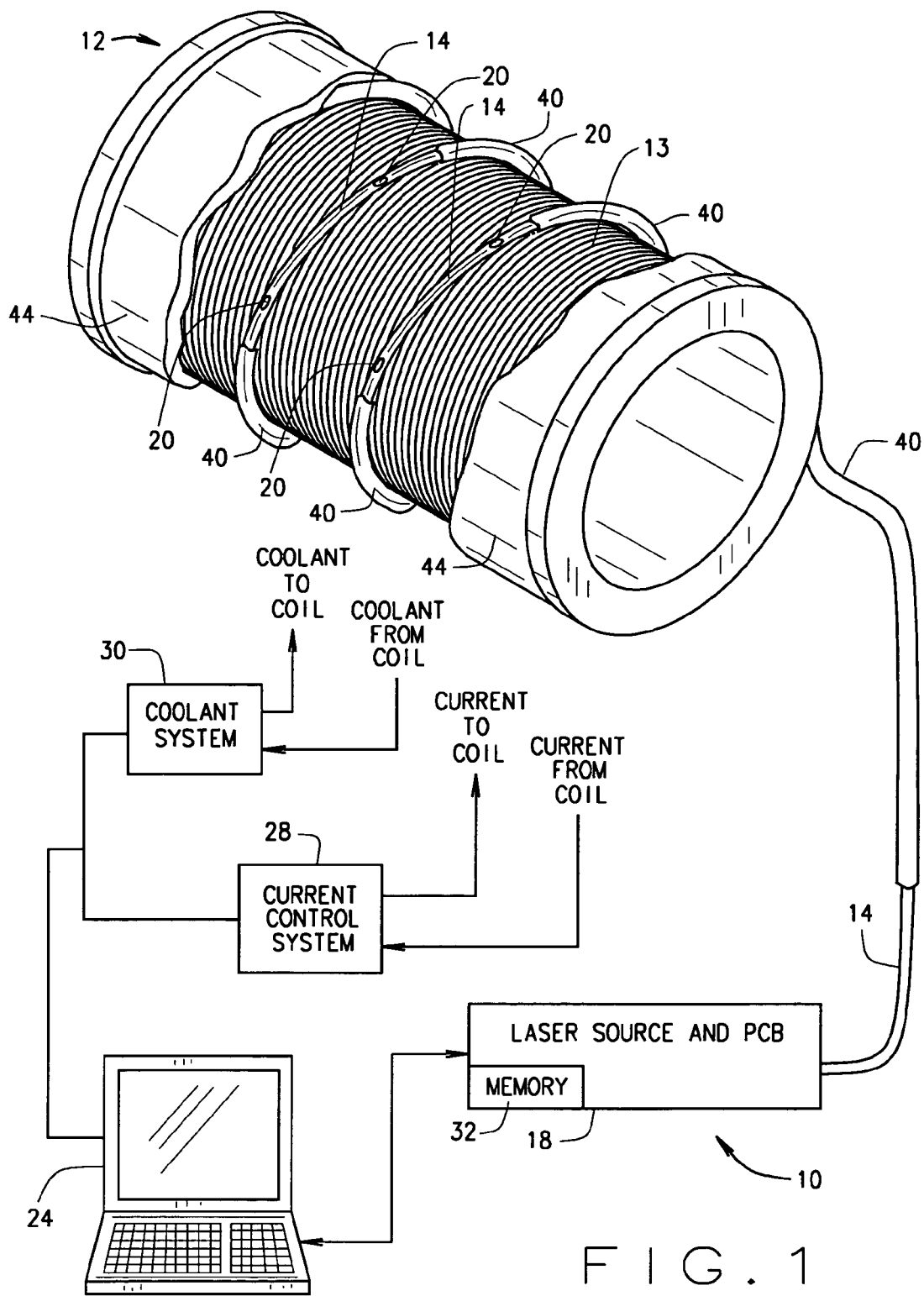
FIG. 1 is a partial cut-away pictorial diagram representative of various configurations of a temperature measurement system of the present invention. The partial cut-away view of the casting allows a view of the sheath and windings therein, whereas the sheath is also partially cut away to reveal a fiber optic fiber having Bragg gratings therein inside the sheath.
Figure 2:
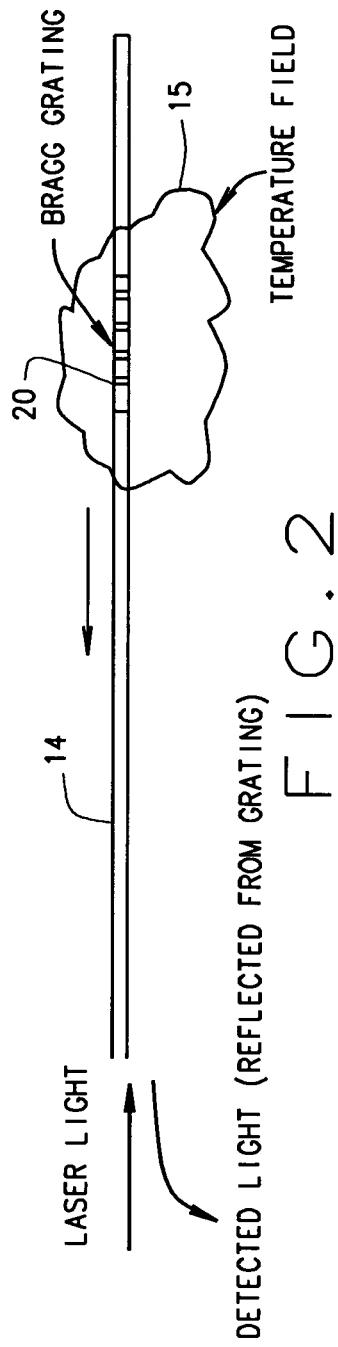
FIG. 2 is a schematic representation of an optical fiber having a Bragg grating that detects a temperature field at the location of the Bragg grating.
Figure 3:
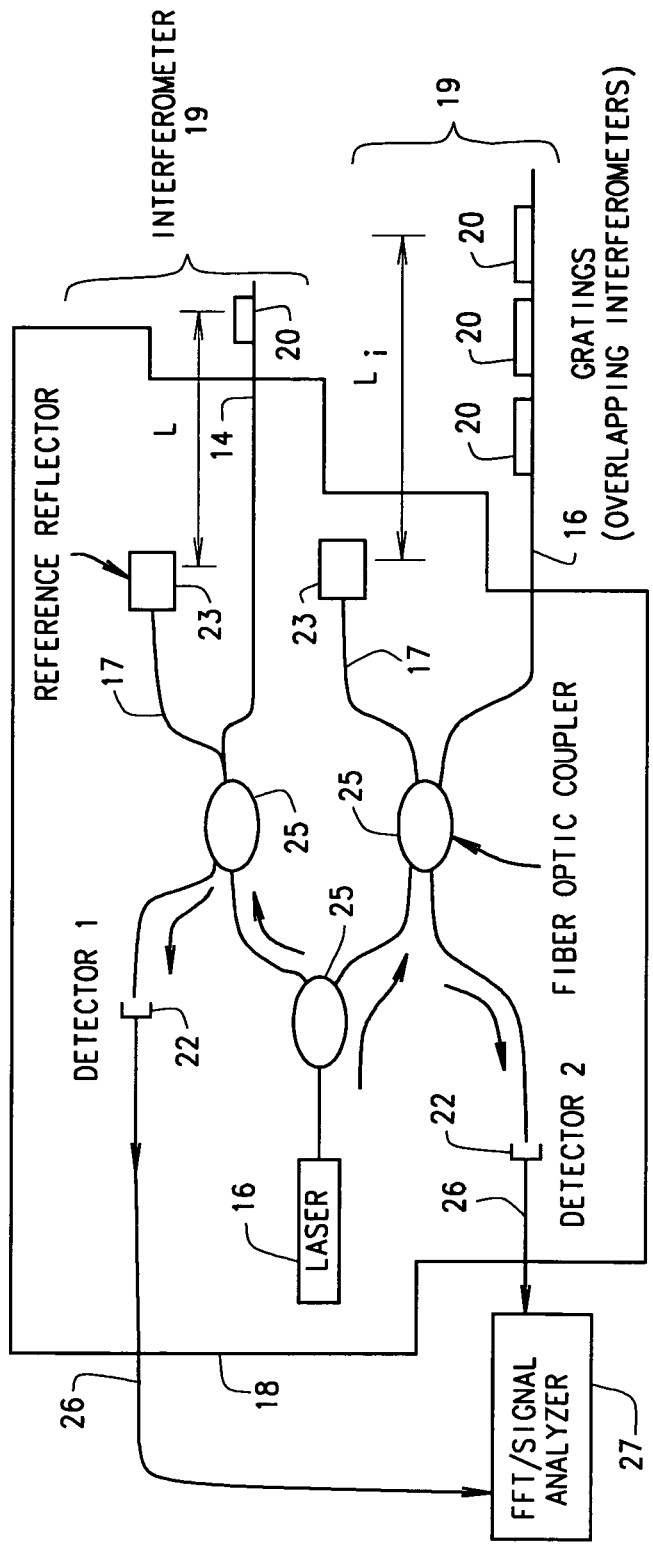
FIG. 3 is a block diagram schematic representation showing more details of various configurations of circuit boards suitable for use in the temperature measurement system configurations of FIG. 1.

In some configurations of the present invention and referring to FIGS. 1, 2 and 3, a fiber-optic based distributed temperature measurement system 10 for an electromagnetic coil assembly 12 facilitates measurement of temperatures within electromagnetic coil assembly 12. One or more non-magnetic (e.g., non-conducting and non-metallic) sheaths 40 are embedded in, under, and/or wound on top of electromagnetic coil assembly 12. (FIG. 1 shows a configuration having a single sheath 40 wound over windings 13 of electromagnetic coil assembly 12 to more clearly show sheath 40, fiber optic fiber 14, and Bragg gratings 20.) In some configurations, sheaths 40 are wrapped in a radial direction, as shown in FIG. 1, or in a z-direction (i.e., parallel to the axis of the electromagnetic coil assembly 12). Also in some configurations, the fibers can be wrapped or snaked multiple times over selected locations of electromagnetic coil locations 12 that are considered significant for monitoring purposes. Single or multiple sheaths 40 can be used, which are cast in the structure of electromagnetic coil assembly 12 along with electromagnetic winding 13. For example, winding 13 and sheath or sheaths 40 are embedded in a cast 44 comprising a non-magnetic casting material. Cooling tubes (not shown in the Figures) may also be embedded along with or spaced from windings 13 and sheaths 40. In some configurations, winding 13 comprises multiple layers, and sheaths 40 are also wound in multiple layers, e.g., in the same layers or between winding 13 layers.

An optical fiber 14 having an outside diameter less than an inside diameter of sheath 40 is slidably inserted into sheath 40, for example, by pushing. Optical fiber 14 is in thermal communication with sheath 40, and sheath 40 is in thermal communication with electromagnetic coil assembly 12, so that optical fiber 14 is (indirectly) in thermal communication with electromagnetic coil assembly 12. For example, optical fiber 14 has an outside diameter of 0.1 mm and sheath 40 has an inside diameter of 0.3 mm. These diameters are representative, and other diameters permitting optical fiber 14 to be inserted into sheath 40 in indirect thermal communication with electromagnetic coil assembly 12 and that avoid coupling physical strain from assembly 12 to fiber 14 can be used. Sheath 40 can be embedded in different layers of magnetic resonance imaging (MRI) gradient coils such as electromagnetic coil assembly 12 and main MRI magnets (not shown in the Figure). Optical fiber or fibers 14 are used to provide accurate measurements of temperatures in temperature fields 15 (shown in FIG. 2) at various portions of coil assembly 12 or the main magnet. Specifically, the temperature at a field 15 at the location of a Bragg grating 20 is measured. (Sheath 40 is not shown in FIG. 2 or 3, but conducts heat from field 15 to Bragg grating 20. Also in some configurations, cast material 44 is also thermally conductive but electrically insulating and non-magnetic.) A laser light or other suitable light source 16 (shown in FIG. 3) is also provided. Light source 16 in some configurations is provided on a circuit board 18 that fits into an MRI apparatus (not shown in the Figures) and is configured to transmit light through optical fiber or fibers 14. Light that is reflected back from sensor or sensors 20 within optical fiber or fibers 14 is detected using one or more optical detectors 22 (shown in FIG. 3), which may also reside on circuit board 18. In some configurations, reference reflectors 23, which may also reside on circuit board 18, are provided.

Fiber optic couplers 25 are also provided as required to couple laser light from laser 16 to optical fiber or fibers 14 having Bragg gratings 20 as sensing elements. Couplers 25 are also provided as necessary to couple laser light from laser 16 to optical fiber or fibers 17 having reference reflectors 23 to thereby form interferometer or interferometers 19 with gratings 20. Fiber optic couplers 25 also couple light reflected back by interferometers 19 to detectors 22, which provide a signal or signals representative of the reflected light over one or more data paths 26 to a Fast Fourier Transform (FFT)/signal analyzer 27, which can reside in processor or computer 24. In some configurations, signal analyzer 27 comprises one or more separate analysis sections or routines for the one or more signals representative of the reflected light from interferometers 19.

In some configurations, light source 16 can be placed at either end of the MRI system, and temperature measurements or raw data from which temperature measurements can be obtained are transferred to a processor 24 that serves as a data acquisition/control unit. The data acquisition/control unit can include the FFT/signal analyzer 27 and can either be a part of the MRI apparatus or separate from the MRI apparatus. For example, processor 24 can be a personal computer as shown in FIG. 1. In some configurations, processor 24 is provided in another location and data is transferred from detector or detectors 22 or the MRI system of which it is a part to processor 24 via a wire or any suitable wired or wireless network. Thus, data path 26 need not be a direct data path, but is in some configurations a public or private network. Control signals may also be provided to light source 16 and detector or sensor 22 via data path 26, or control signals may be provided by the apparatus in which circuit board 18 and/or electromagnetic coil assembly 12 is embedded.

In some configurations of the present invention, a laser light from laser 16 is passed through optical fiber 14, which contains a plurality of Bragg gratings or sensors 20 etched onto the fiber core itself. Fiber optic Bragg gratings 20 act as sensors by modulating laser light and reflecting back a signature light having a dominant wavelength indicative of the temperature of electromagnetic coil assembly 12 at a temperature field 15 at the location of sensor 20. Although not shown in FIG. 2, processor 24 is configured to utilize optical frequency domain reflectometry (OFDR) methods to distinguish individual signals from corresponding Bragg sensors 20 using a variable frequency laser. A wavelength shift measured from each sensor 20 corresponds to a temperature change and hence is indicative of the temperature of electromagnetic coil assembly 12 at a location of the corresponding Bragg grating 20.

Some configurations of the present invention utilize a plurality of optical fibers or optic fiber fibers 14, which are separately inserted in sheaths 40 so that sensors 20 are at thermally sensitive locations of electromagnetic coil assembly 12. Data from a plurality of sensors 20 in different locations of electromagnetic coil assembly 12 are obtained. This data can be used by processor 24 to control power applied to the one or more electromagnetic windings 13 of electromagnetic coil assembly 12 by a current control system 28 so that power is applied only under safe conditions.

In other configurations, processor 24 uses the data obtained to control a coolant system 30 to circulate extra coolant (for example, via cooling tubes not shown in the Figures) to avoid overheating electromagnetic coil assembly 12. In some configurations, extra coolant can be circulated directly to and from an overheated portion of electromagnetic coil assembly 12 via a selection of different cooling tubes. Additional ventilation (not shown in the Figures) may also be provided to electromagnetic coil assembly 12 in some configurations, or a combination of cooling methods may be used. In some configurations, a cooling system such as a remote chiller/heat exchanger is used in place of coolant system 30 described above.

In some configurations, optical fiber or fibers 14 (only one of which is shown in FIG. 1) contain hundreds or even thousands of sensors 20, making it possible to accurately pinpoint locations of excessive heating in electromagnetic coil assembly 12. Such accurate pinpointing is particularly useful in MRI gradient coils and main magnets, as is the ability to infer detailed temperature distributions from a large number of discrete measurements.

In some configurations of the present invention, a method is provided for monitoring temperature in at least one location of an electromagnetic coil assembly.

In these configurations, a current is passed through an electrical winding 13 of electromagnetic coil assembly 12. This current (which may either be supplied from an external source or induced by a moving magnet, as in a generator) results in electrical winding 13 and electromagnetic coil assembly 12 being heated, perhaps unevenly. A light from a light source 16 is passed through a non-magnetic optical fiber 14 that is inserted in a non-magnetic sheath 40 that is wound and cast with electrical winding 13. In some configurations, light source 16 is a laser, for example, a variable frequency laser. By being "wound and cast with electrical winding," sheath 40 is in thermal communication with electrical winding 16, or a portion of electromagnetic coil assembly 12 heated by electrical winding 16. In turn, optical fiber 14 is in thermal communication with sheath 40, and is thus indirectly in thermal communication with electromagnetic coil assembly 12. Because optical fiber 14 is free to slide inside sheath 40, it is essentially isolated from stresses that deform electromagnetic coil assembly 12, so that Bragg gratings 20 in optical fiber 14 are essentially unaffected by such stresses.

Optical fiber 14 has a core containing at least a first Bragg grating 20 etched therein. (Many configurations of the present invention include a large number of such gratings 20. The term "first" is thus used to distinguish a particular instance of a Bragg grating 20 from other instances, rather than to imply any particular ordering in distance, size, importance, time, etc.) A detector 22 is used to detect a wavelength of light reflected back from first Bragg grating 20. Processor 24 (or another processor, such as one included on circuit board 18 or elsewhere) is then used to determine a temperature of electromagnetic coil assembly 12 at a location of the first Bragg grating. Processor 24 uses the detected wavelength of the light reflected from this grating to make this determination.

In some configurations of the present invention, a plurality of Bragg gratings 20 are etched in fiber 14 at different lengths along optical fiber 14 to disperse gratings 20 at different locations in electromagnetic coil assembly 12 when optical fiber 14 is inserted (e.g., pushed into) sheath 40. In these configurations, a wavelength of light is also detected from at least a second Bragg grating 20 at a location spaced apart from the location of the first Bragg grating. A temperature of electromagnetic coil assembly 12 is determined utilizing the detected wavelength of light reflected from the second Bragg grating. Any suitable processing technique is used to process the reflected optical signal. For example, optical frequency domain reflectometry is used in some configurations to distinguish reflected light from different Bragg gratings 20. A non-exhaustive list of other suitable techniques include optical coherence domain reflectometry, and intensity-based reflectometry.

In some configurations, light reflected from a plurality of Bragg gratings 20 is used to monitor temperature within electromagnetic coil assembly 12. In some configurations, electromagnetic coil assembly 12 is cooled in accordance with the determined temperatures. Precalibration of optical fiber or fibers 14 with Bragg gratings 20 is performed in various configurations of the present invention to provide thermal curves and/or data to processor 24 (or another processor) for more accurate determination of temperature.

In some configurations, electromagnetic coil assembly 12 is in a magnetic resonance imaging system. In some other configurations, electromagnetic coil assembly 12 is in an electric machine.

As used herein, the terms "first," "second," "third," etc. are used merely to distinguish different instances of similar objects or structures, or different occurrences of similar events. Unless explicitly stated otherwise, this numbering is used without regard for ordering in time, space, distance, importance, etc., unless explicitly stated otherwise. Also, claims appended hereto that recite the term "optical fiber" are intended to include within their scope configurations having one or more optical fibers and/or optic fibers unless otherwise explicitly stated therein.

Configurations of the present invention provide optical temperature measurements while themselves being immune to interference from magnetic field and from electromagnetic interference. The optical temperature measurements are also essential free from interference by stresses in electromagnetic coil assembly 12 due to the slidable engagement of optical fiber 14 with sheath 40. A control board 18 with a built in laser source 16 can send and receive the signals. Measurements are stored in a memory 32 on printed circuit board 18 in some configurations of the present invention. These measurements can be transferred either to a personal computer 24 on site or remote site based on the nature of the requirements. In some configurations, a processor 24 is built into the MRI apparatus itself. In various configurations, processor 24 comprises a control board having a plurality of components, including, for example, a microprocessor. Some configurations of the present invention include processors 24 that provide both control and data analysis functions.

Detailed temperature distributions for MRI systems can thus be made available to enable better temperature control and operation, thus providing MRI systems with improved performance and reliability. Moreover, optical fibers 14 and sheaths are non-magnetic in the sense that they do not carry current, and do not disrupt or alter a magnetic field in a region of interest of the MRI apparatus. In addition, wires are not required from each temperature sensor to a data acquisition system.

Moreover, because the measurement system employs light instead of electrical currents for its sensors, it is essentially immune from electromagnetic interference, even with hundreds or even thousands of sensors in a single fiber 14. The sensors themselves are very low weight, enabling thermal measurments that can be used to increase the reliability of systems in which they are embedded. Moreover, they are highly reliable and require very little if any servicing and maintenance.

Although configurations of the present invention are described in conjunction with magnetic resonance imaging systems, it will be recognized that the invention is useful in many other applications as well. For example, configurations of electromagnetic coil assemblies 12 of the present invention will find use in other applications in which current through one or more electromagnetic windings 13 generates a significant amount of heat, and especially in applications in which such heat is localized. Such applications may include, for example, electric machines such as generators and motors.

While the invention has been described in terms of various specific embodiments, those skilled in the art will recognize that the invention can be practiced with modification within the spirit and scope of the claims.

What is claimed is:

1. An electromagnetic coil assembly kit comprising:
   an electrically conducting electromagnetic winding, and a non-magnetic sheath wound and cast therein;
   a non-magnetic optic fiber configured for insertion in the sheath and having distributed therein a plurality of Bragg gratings each configured to reflect light indicative of temperature at a location of the Bragg gratings in the electromagnetic coil assembly.

2. An electric machine comprising an electromagnetic coil assembly kit in accordance with claim 1.

3. A magnetic resonance imaging apparatus having an electromagnetic coil assembly kit in accordance with claim 1, wherein said electromagnetic winding is configured as a gradient coil or a main MRI magnet.

4. The magnetic resonance imaging apparatus in accordance with claim 3, wherein the optic fiber is inserted in the sheath.

5. A method for monitoring temperature in at least one location of an electromagnetic coil assembly, the electromagnetic coil assembly having at least one electrical winding, said method comprising:
   passing a light through a non-magnetic optical fiber inserted in a non-magnetic sheath wound and cast with the electrical winding, the optical fiber having a core containing at least a first Bragg grating etched therein;
   detecting a wavelength of light reflected from the first Bragg grating; and
   determining a temperature of the electromagnetic coil assembly at a location of the first Bragg grating utilizing the detected wavelength of the light reflected from the first Bragg grating.

6. The method of claim 5, wherein said passing a light through an optical fiber comprises passing light from a laser through the optical fiber.

7. The method of claim 5, further comprising passing a current through an electrical winding of the electromagnetic coil assembly.

8. The method of claim 5, wherein the core of the optical fiber has a plurality of Bragg gratings etched therein at different lengths along the fiber, and wherein the Bragg gratings in the wound optical fiber are disposed at different locations in the electromagnetic coil assembly; and further comprising:
   detecting a wavelength of light reflected from at least a second Bragg grating at a location spaced apart from the location of the first Bragg grating; and
   determining a temperature of the electromagnetic coil assembly at least at a location of the second Bragg grating utilizing the detected wavelength of the light reflected from the second Bragg grating.

9. The method of claim 8, wherein light reflected from a plurality of Bragg gratings is used to monitor temperature at a plurality of locations in the electromagnetic coil assembly.

10. The method of claim 8, wherein the electromagnetic coil assembly is in an electric machine.

11. The method of claim 8, wherein the electromagnetic coil assembly is in a magnetic resonance imaging system.

12. The method of claim 8, further comprising cooling the electromagnetic coil assembly in accordance with the determined temperatures.

13. The method of claim 8, wherein said passing a light through an optical fiber comprises passing light from a variable frequency laser through the optical fiber.

14. The method of claim 13, further comprising distinguishing reflected light from the at least a second Bragg grating from reflected light from the first Bragg grating utilizing optical frequency domain reflectometry.

15. The method of claim 13, further comprising distinguishing reflected light from the at least a second Bragg grating from reflected light from the first Bragg grating utilizing optical time domain reflectometry.

16. The method of claim 13, further comprising distinguishing reflected light from the at least a second Bragg grating from reflected light from the first Bragg grating utilizing intensity based reflectometry.

17. A measuring apparatus for temperature comprising:
   an electromagnetic coil assembly having an electrically conducting electromagnetic winding, a non-magnetic sheath wound and cast therewith, and a non-magnetic optic fiber inserted in the sheath and in thermal communication with the electromagnetic winding, said optic fiber having distributed therein a plurality of Bragg gratings each configured to reflect light indicative of a temperature at a location thereof;
   a light source configured to pass light into the optic fiber;
   a reflected light sensor configured to sense light reflected back from the Bragg gratings; and
   a processor responsive to the reflected light sensor to determine temperature utilizing said reflected light.

18. A magnetic resonance imaging apparatus having a temperature measuring apparatus in accordance with claim 17, and further wherein said electromagnetic winding is configured as a gradient coil.

19. The temperature measuring apparatus in accordance with claim 17, wherein said processor is configured to at least one of turn off current through the electromagnetic winding, or provide additional coolant or ventilation when a determined temperature exceeds a limit.

20. A magnetic resonance imaging apparatus having a temperature measuring apparatus in accordance with claim 19, and further wherein said electromagnetic winding is configured as a gradient coil.

21. The temperature measuring apparatus in accordance with claim 17, wherein said light source is a laser.

22. The temperature measuring apparatus in accordance with claim 21, wherein said laser is a variable frequency laser.

23. The temperature measuring apparatus in accordance with claim 22, wherein said processor is configured to utilize optical frequency domain reflectometry to determine said temperature.

24. The temperature measuring apparatus in accordance with claim 22, wherein said processor is configured to utilize optical coherence domain reflectometry to determine said temperature.

25. The temperature measuring apparatus in accordance with claim 22, wherein said processor is configured to utilize intensity based reflectometry to determine said temperature.

* * * * *